US012063889B2

(12) United States Patent
Lu et al.

(10) Patent No.: US 12,063,889 B2
(45) Date of Patent: Aug. 20, 2024

(54) SYSTEM AND METHOD FOR HARVESTING FRUIT

(71) Applicants: The United States of America, as represented by the Secretary of Agriculture, Washington, DC (US); Board of Trustees of Michigan State University, East Lansing, MI (US)

(72) Inventors: Renfu Lu, Okemos, MI (US); Zhaojian Li, Ann Arbor, MI (US); Kyle Lammers, Grand Rapids, MI (US)

(73) Assignees: The United States of America, as represented by the Secretary of Agriculture, Washington, DC (US); Board of Trustees of Michigan State University, East Lansing, MI (US)

( * ) Notice: Subject to any disclaimer, the term of this patent is extended or adjusted under 35 U.S.C. 154(b) by 784 days.

(21) Appl. No.: 17/188,177

(22) Filed: Mar. 1, 2021

(65) Prior Publication Data
US 2021/0267125 A1 Sep. 2, 2021

Related U.S. Application Data

(60) Provisional application No. 62/982,833, filed on Feb. 28, 2020.

(51) Int. Cl.
A01D 46/30 (2006.01)
A01D 46/24 (2006.01)
B25J 9/16 (2006.01)
B25J 15/06 (2006.01)
G06V 20/10 (2022.01)

(52) U.S. Cl.
CPC ............ A01D 46/30 (2013.01); A01D 46/24 (2013.01); B25J 9/1697 (2013.01); B25J 15/0616 (2013.01); G06V 20/188 (2022.01)

(58) Field of Classification Search
CPC ................................ A01D 46/30; A01D 46/24
See application file for complete search history.

(56) References Cited

U.S. PATENT DOCUMENTS

| 3,854,273 | A | * | 12/1974 | Rosenberg | ........... | A01D 46/247 |
| | | | | | | 56/336 |
| 4,532,757 | A | * | 8/1985 | Tutle | ...................... | A01D 46/30 |
| | | | | | | 382/110 |
| 4,663,925 | A | * | 5/1987 | Terada | ..................... | B25J 5/007 |
| | | | | | | 414/730 |
| 11,370,129 | B2 | * | 6/2022 | Salisbury | ............... | A01D 46/22 |
| 2008/0189870 | A1 | * | 8/2008 | Dayton | ..................... | B08B 1/04 |
| | | | | | | 173/217 |
| 2019/0166765 | A1 | * | 6/2019 | Maor | ..................... | A01D 46/30 |

(Continued)

Primary Examiner — Abigail A Risic
(74) Attorney, Agent, or Firm — John Fado; Matthew Bussan

(57) ABSTRACT

A three-dimensional stereo vision camera communicates the location of a targeted fruit (preferably an apple) to a controller. The controller directs a vacuum selection tube to the location of the targeted apple. The selection tube has a gripping orifice that has a smaller diameter than the apple so that the vacuum suction from the selection tube grips the apple. The selected fruit is then rotated and pulled away from the tree canopy by the selection tube until the apple detaches from the canopy. The detached apple is then gently placed in a collection bin for later sorting and processing.

19 Claims, 12 Drawing Sheets

(56) References Cited

U.S. PATENT DOCUMENTS

| | | | |
|---|---|---|---|
| 2020/0196528 A1* | 6/2020 | Salisbury | A01D 46/005 |
| 2020/0323140 A1* | 10/2020 | Gielis | A01D 46/24 |
| 2020/0333782 A1* | 10/2020 | Kent | G05D 1/0027 |
| 2021/0374894 A1* | 12/2021 | Wisdom | G06V 20/56 |
| 2022/0087106 A1* | 3/2022 | Faulring | A01D 46/005 |
| 2023/0189713 A1* | 6/2023 | Maor | A01D 46/30 |
| | | | 56/328.1 |

* cited by examiner

SYSTEM AND METHOD FOR HARVESTING FRUIT

REFERENCE TO RELATED APPLICATIONS

This application claims the benefit of U.S. Provisional Application No. 62/982,833, filed Feb. 28, 2020, which is incorporated herein by reference in its entirety.

FIELD OF THE INVENTION

The disclosed subject matter relates to harvesting fruit with automated equipment.

Specifically, the subject matter described herein relates to an apple harvesting system which locates and selectively detaches apples using an automated vacuum-based process.

BACKGROUND OF THE INVENTION

Worldwide production of apples in 2017 was 83.1 million tonnes, with China accounting for half of the total, and the US accounting for about 5.2 million tonnes. In spite of the massive size of the harvest, most apples are still harvested by hand. Locating an individual apple, detaching the apple from a tree, and depositing the apple into a collection apparatus without bruising the apple has proven to be a significant challenge for automated machinery designers.

Apple trees have dense foliage that makes it difficult to use automated equipment to locate and selectively pick a targeted apple. The prior art technologies commonly use robotic "fingers" that mimic a human hand to "pick" an apple. These systems require complex fine motor movements in multiple degrees of freedom to dexterously grasp and detach an apple. The picking process requires positioning the "hand" and "fingers" precisely in the right positions with a narrow margin of error.

Even when machinery can be successfully manipulated into the correct position, the process is slow, and robotic "hands" are prone to missing and/or bruising the target apples. The process is particularly challenging in a field/orchard environment where a harvest trailer on which the robot is mounted may be moving/travelling. Simultaneously, the targeted fruit is frequently moved by the wind/weather, or the inadvertent actions of other mechanized equipment. Further, apples often grow in clusters, and when the robotic hand picks a targeted apple from a cluster, it could easily damage or knock off the neighboring apples in the cluster.

The prior art includes vacuum-based systems that comprise relatively large vacuum hoses that suck the apples into the hose, and then direct the apples through the inside of the hose to a collection bin. However, in addition to the apples, the large vacuum hoses also tend to suck in foliage, bird nests, insects, and anything else in the path of the vacuum intake. Among other things, this can damage the trees and clog the system.

The need exists for a system that can quickly and efficiently locate, detach, and direct harvested apples into a collection system without damaging the fruit. The system described herein comprises a three-dimensional stereo-vision camera that locates the fruit and directs (via a controller) a vacuum-based selection and detachment tube to engage and detach the fruit, which is then deposited in a collection system for further processing.

SUMMARY OF THE INVENTION

This disclosure is directed to a fruit harvesting system. The fruit harvesting system comprises a three-dimensional stereo graphic camera that is in electronic communication with a controller/processor. The camera identifies a targeted fruit in a tree canopy, and then communicates the fruit's location to the controller. The controller is in electronic communication with mechanical tilting and panning mechanisms that are connected to a vacuum selection tube. The controller directs the tilting and panning mechanisms to position the selection tube to engage the targeted fruit. Simultaneously, the controller also directs the linear actuator, which carries the tilting and panning mechanisms, to move towards the target fruit. The selection tube comprises a gripping orifice that has a diameter smaller than the diameter of the targeted fruit.

The fruit harvesting system is structured so that after the camera identifies the targeted fruit, the tilting and panning mechanisms move the vacuum tube so that the gripping orifice grips, holds, and rotates to detach the targeted fruit from a tree.

BRIEF DESCRIPTION OF THE DRAWINGS

FIG. 6B is a schematic view of the rear face of the back mounting plate 27 showing the support rollers 39 with the drive gear 33 ghosted in.

FIG. 10 shows two bearings/collars 53 mounted on the outside of the selection tube 18, the large selection tube rotating gear 35, the generic gripping orifice 34 and the pressure sensor 36.

DETAILED DESCRIPTION OF PREFERRED EMBODIMENTS

Figure 1:
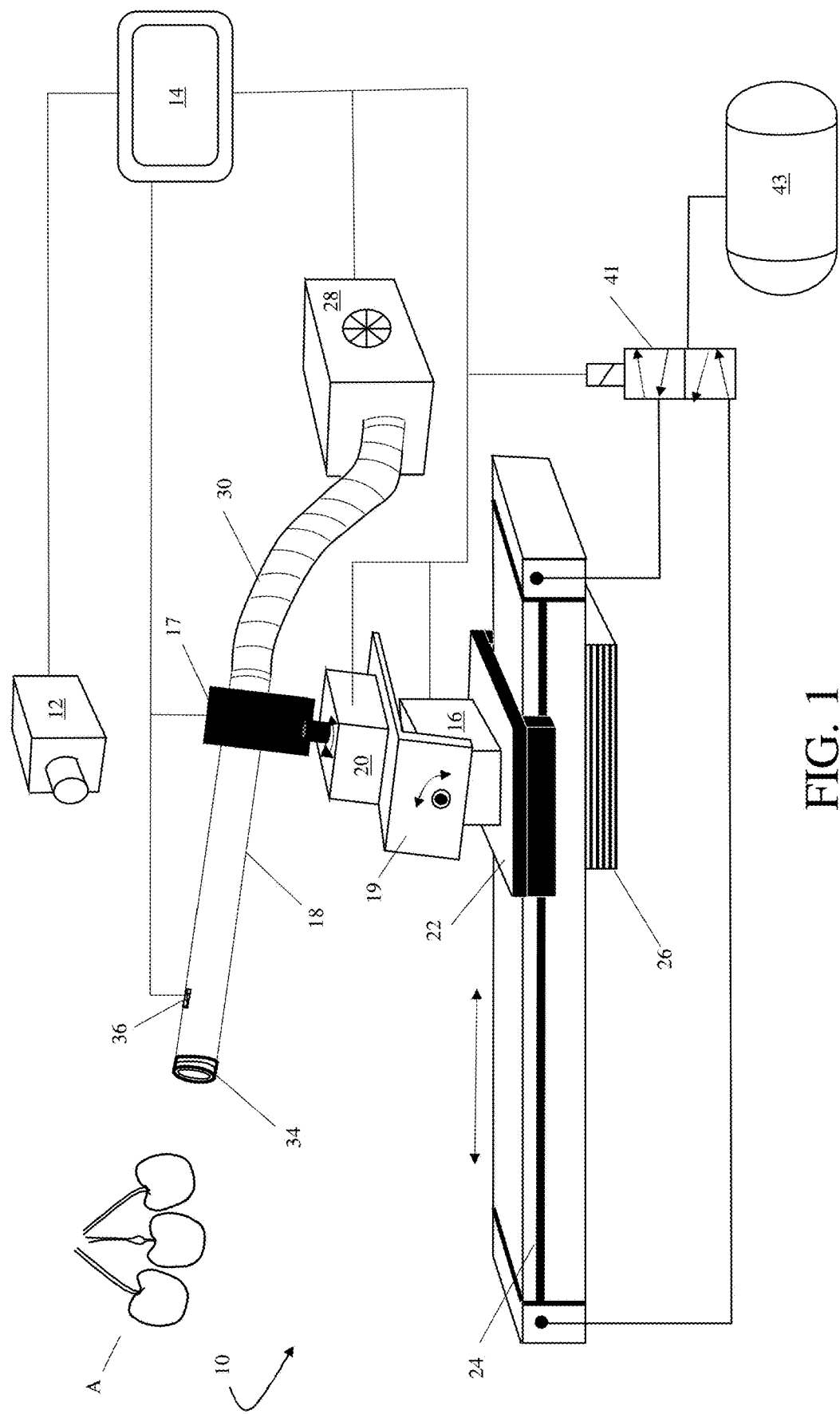
FIG. 1 is a schematic view of an apple harvesting system 10 described herein.

As generally shown in FIG. 1, the method and apparatus described herein comprises a robotic apple harvesting system 10. The system 10 includes a three-dimensional stereo vision camera 12 mounted in an elevated position and directed to an area of the tree canopy that includes one or more apples A designated for harvest. The camera 12 is in electronic communication with a processor/controller 14 which processes the camera 12 images and communicates control instructions to other elements of the harvest system 10.

Specifically, as schematically shown in FIG. 1, the controller 14 communicates with a tilting mechanism 16 which moves/tilts a relatively small diameter selection and detachment tube 18 in a vertical plane. Similarly, a panning mechanism 20 moves the selection tube 18 in a horizontal plane. A selection tube control assembly 17 mechanically manipulates the selection tube 18. The selection tube control assembly 17 comprises a mechanical linkage between the tilt 16 and pan 20 mechanisms and rotational components within the assembly 17 (see FIGS. 4-7). The tilt 16 and pan 20 mechanisms are connected to through a right angle plate 19, and they are positioned on a lateral sliding means/base 22, which moves/slides the entire selection assembly 16, 17, 18, 19, 20 horizontally into (and out of) a tree canopy.

In the preferred embodiment, the lateral sliding base 22 is moved and positioned by a pneumatic actuator of the type that is well known in the mechanical arts. A position sensor on the actuator monitors the movement of the sliding base 22 and sends the information to the controller 14. The pneumatic actuator and sliding base 22 are connected to a compressor 43 through a two-way pneumatic valve 41, which is in turn, controlled by the controller 14. The pneumatic actuator (via the sliding base 22) slides the selection tube assembly 16, 17, 18, 19, 20 horizontally on a corresponding slotted track 24. In an alternative embodiment, the pneumatic actuator comprises an electric motor-driven linear actuator or another form of linear movement means such as a hydraulic actuator, an electric screw or belt drive, chain drive, cable drive, gear drive mechanisms, or any other movement mechanism consistent with the function of moving the sliding base laterally.

Vertical movement of the selection assembly 16, 17, 18, 19, 20 and the pneumatic actuator 22 is controlled/enabled by an expandable vertical lifting means 26. In the preferred embodiment, the vertical lifting means 26 comprises a telescoping hydraulic lift, although the lifting means 26, although the lifting means may be powered pneumatically, electrically, or hydraulically through a non-telescoping means. The vertical lifting means 26 may also comprise a scissor type configuration, an elevator-type cable mechanism, a vertically-traveling screw type mechanism, or any other lift configuration known in the art consistent with moving the selection assembly 16, 17, 18, 19, 20 vertically. Under routine operating conditions, the vertical lifting mechanism 26 may be used sparingly because the targeted fruit is generally accessible and within the range of the tilt mechanism 16 without further vertical elevation.

As best shown in FIG. 1, the selection tube 18 is connected to a vacuum source. In the preferred embodiment the vacuum source comprises a powerful vacuum motor 28, although other means of creating a vacuum should be considered within the scope of the invention. The vacuum motor 28 is connected to the vacuum selection tube 18 by an expandable vacuum hose 30, which can accommodate the entire range of movement of the selection tube 18. The selection tube 18 in combination with the vacuum hose 30, the vacuum motor 28, and a fruit gripping orifice 34 comprises the vacuum system 18, 28, 30, 34.

Figure 2:
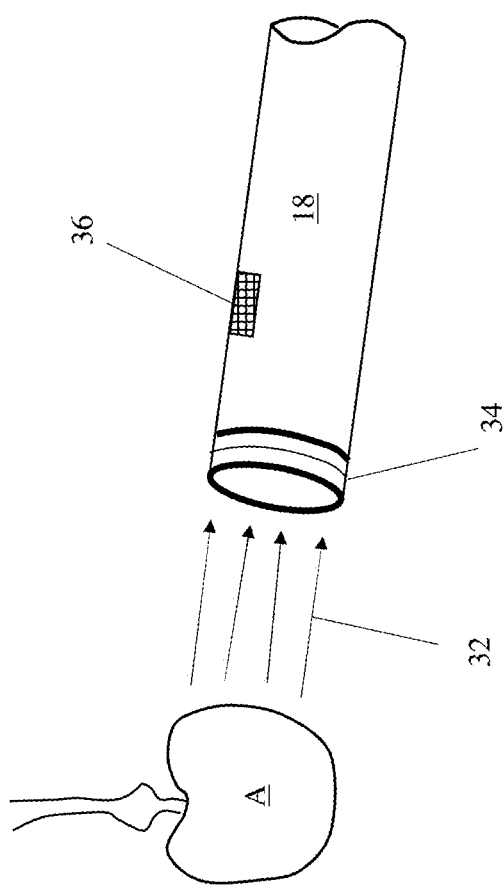
FIG. 2 is a schematic view of an apple selection and detachment tube 18 prior to engagement with an apple A.

As best shown in FIG. 2, as the selection tube 18 approaches a targeted apple A, the vacuum suction from the vacuum motor 28 draws the apple A toward the mouth of the tube 18 in the direction of the arrows 32. The end of the selection tube 18 forms a soft, flexible, and resilient surface that, in combination with the vacuum suction, comprises a (generic) fruit gripping orifice 34. In the preferred embodiment, the vacuum motor 28 operates constantly, as the tube 18 moves toward the target fruit A and then retreats to its original position.

To help prevent foliage and other debris from clogging the vacuum system 18, 28, 30, 34, an automatic debris removal mechanism can be incorporated into the vacuum motor 28 (or another portion of the vacuum system 18, 28, 30, 34) so that the system 18, 28, 30, 34 can operate continuously without disruption. In an alternative embodiment, the vacuum motor 28 operates in the on/off mode. In the on/off mode, the vacuum motor 28 is turned off until the selection tube is positioned near the targeted apple A. The vacuum motor 28 is turned back on but only for as long as it takes for the selection tube 18 to detach the apple A and move it to a fruit collection point. The on/off operation mode reduces energy consumption and minimizes or prevents the opportunities for the selection tube 18 to suck in foliage and other debris, thus avoiding damage to the tree and the vacuum system 18, 28, 30, 34.

In the preferred embodiment, the orifice 34 of the selection tube 18 has about the same diameter as the tube 18. The orifice 34 is covered with soft material to improve the sealing and gripping connection between the selection tube 18 and the targeted fruit so that the orifice 34 can firmly grip the targeted fruit A.

For the purpose of this disclosure, the terms "gripping orifice" and "end effector" may be used interchangeably. The gripping orifice/end effector 34 shown in FIGS. 1-4, 7-8 and 10 is defined and treated as a "generic gripping orifice" in this disclosure. However, in alternative embodiments, the generic gripping orifice 34 may be replaced with a more specialized gripping orifice as shown (for example) in FIGS. 11A.-11D. For the purposes of this disclosure, a "straight end effector 55" is defined as the end effector shaped as shown in FIG. 11A; a "funnel-shaped end effector 56" is defined as the end effector shaped as shown in FIG. 11B; a "curved funnel-shaped end effector 57" is defined as the end effector shaped as shown in FIG. 11C; or, a "bellows-shaped end effector 58" is defined as the end effector shaped as shown in FIG. 11D.

Gripping orifices/effectors are designed to create the most effective seal practical with the targeted fruit. These orifices 55, 56, 57, 58 may be further modified to specifically address the size, shape, and characteristics of the fruit to be harvested. Additionally, the orifice/effectors 55, 56, 57, 58 may be comprised of a variety of soft, flexible material such as silicon, rubber, latex, composite materials, or any other durable but flexible materials consistent with the function of forming at least a partial seal between the vacuum selector tube 18 and the targeted fruit.

Figure 3:
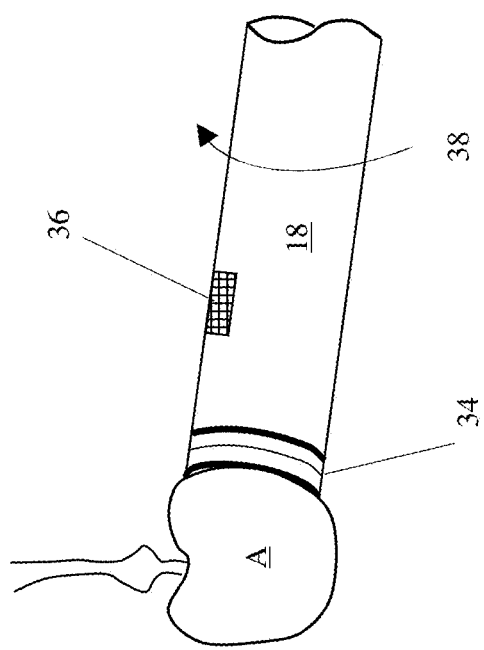
FIG. 3 is a schematic view of an apple selection and detachment tube 18 as the tube 18 engages the apple A and rotates the tube 18 to detach the apple A.

As best shown in FIG. 3, when the selection tube 18 engages the target apple A, the gripping orifice 34 forms (at least) a partial seal with the apple A. When the gripping orifice 34 grips the apple A, a pressure sensor 36 on the selection tube 18 measures and monitors the pressure drop in the tube 18. When the pressure drop reaches a preset threshold, the controller 14 communicates with the selection tube control assembly 17, which then rotates the apple A in the direction of the arrow 38 for a specific angle (i.e., 90-120 degrees).

Alternatively, the selection tube 18 and the attached apple A may be rotated multiple full or partial revolutions, or the apple may be rotated in one direction, and then the direction of rotation may be reversed. Other rotation and detaching manipulations consistent with disconnecting the apple A from the tree canopy should be considered within the scope of the invention.

Figure 4:
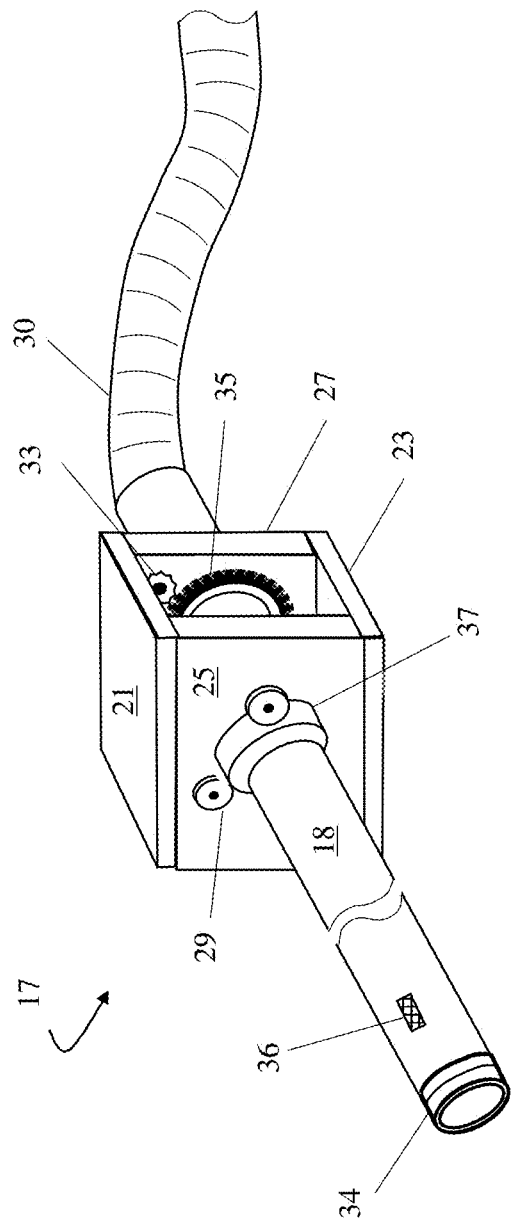
FIG. 4 is a schematic view of the vacuum selection tube 18 control assembly 17 with one sidewall of the control assembly 17 housing removed.

As best shown in FIG. 4, in the preferred embodiment, the selection tube control assembly 17 comprises a housing with (at least) two horizonal plates 21, 23 and two vertical plates 25, 27. The bottom horizontal plate 23 is mounted on a shaft of the panning mechanism 20 (see FIG. 1). The selection tube 18 extends (generally) horizontally through apertures in the vertical plates 25, 27.

Figure 5B:
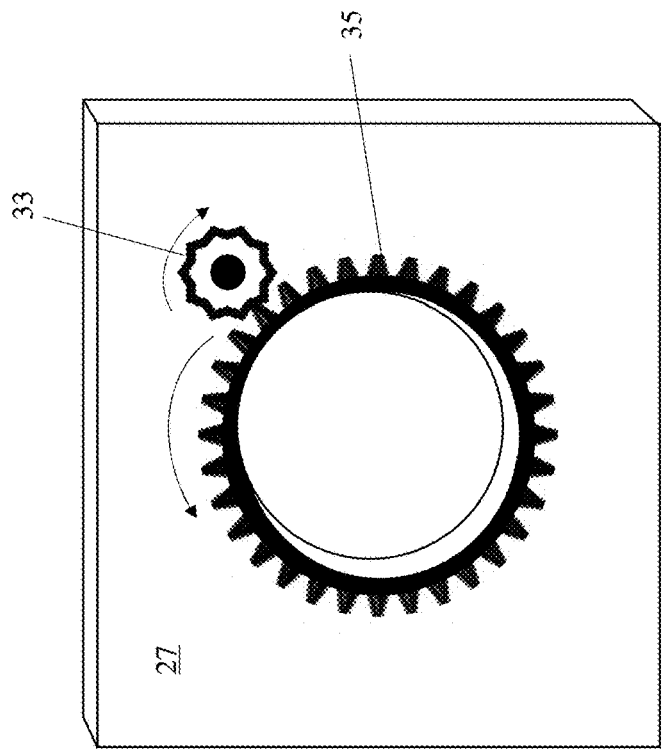
FIG. 5B is a schematic view of a pair of interlocking power transmission gears 33, 35 on the front face of the rear mounting plate 27. In operation, the lager gear 35 is mounted on the selection tube 18 (not shown) and rotates the selection tube 18 during the apple detachment process.
Figure 5A:
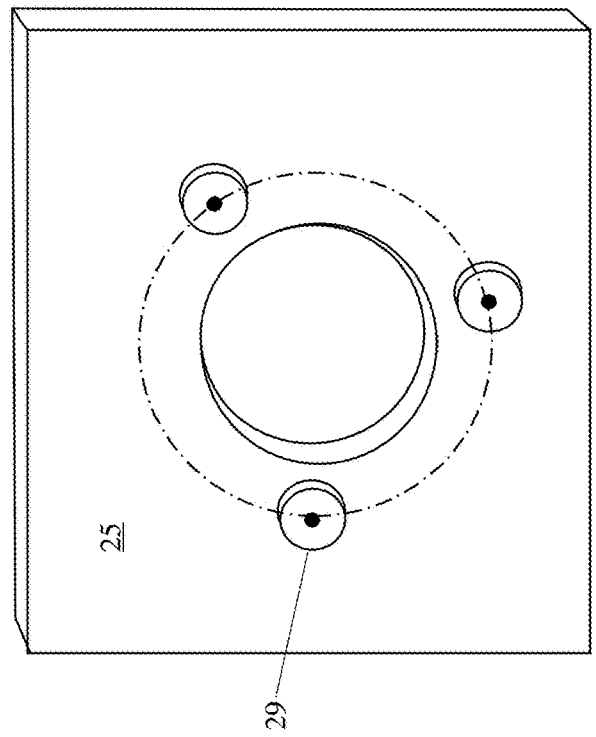
FIG. 5A is a schematic of the front face of the front mounting plate 25 of the control assembly 17 housing. Three support and stabilization rollers 29 support the selection tube 18 (not shown) as the tube 18 passes through the circular opening in the mounting plate 25.
Figure 6B:
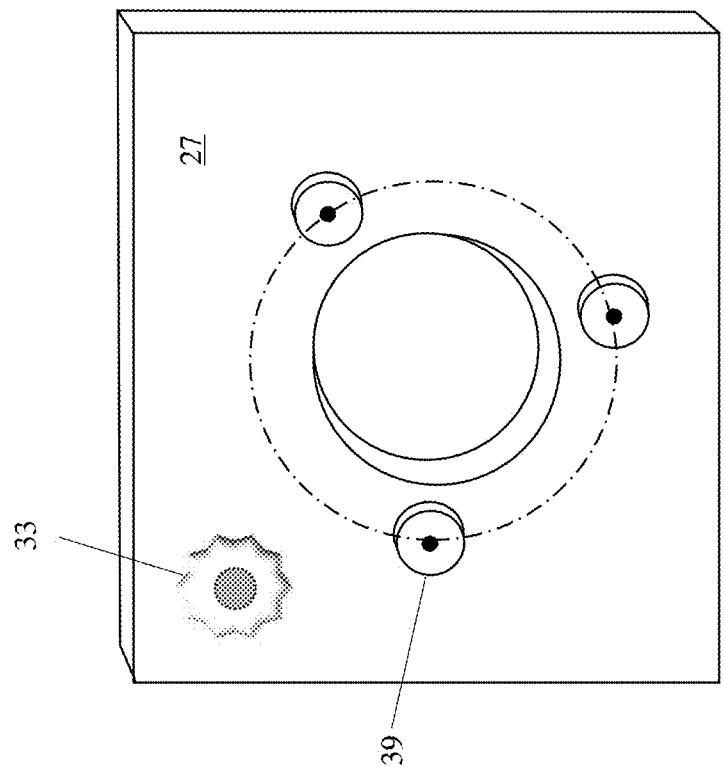
Figure 6A:
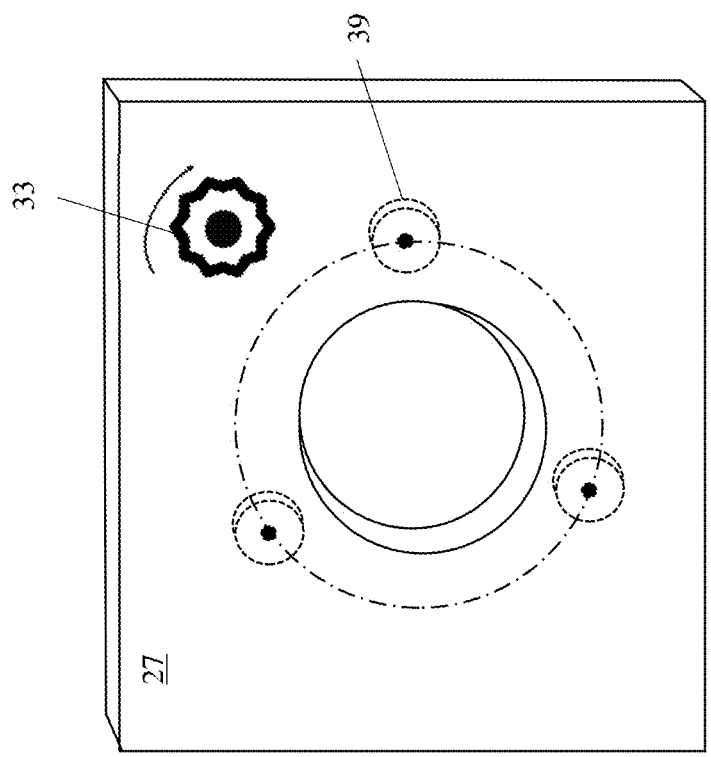
FIG. 6A is a schematic view of the front face of the rear mounting plate 27 showing the driving gear 33 and the stabilization and support rollers 39 ghosted in on the rear face of the rear mounting plate 27.
Figure 7:
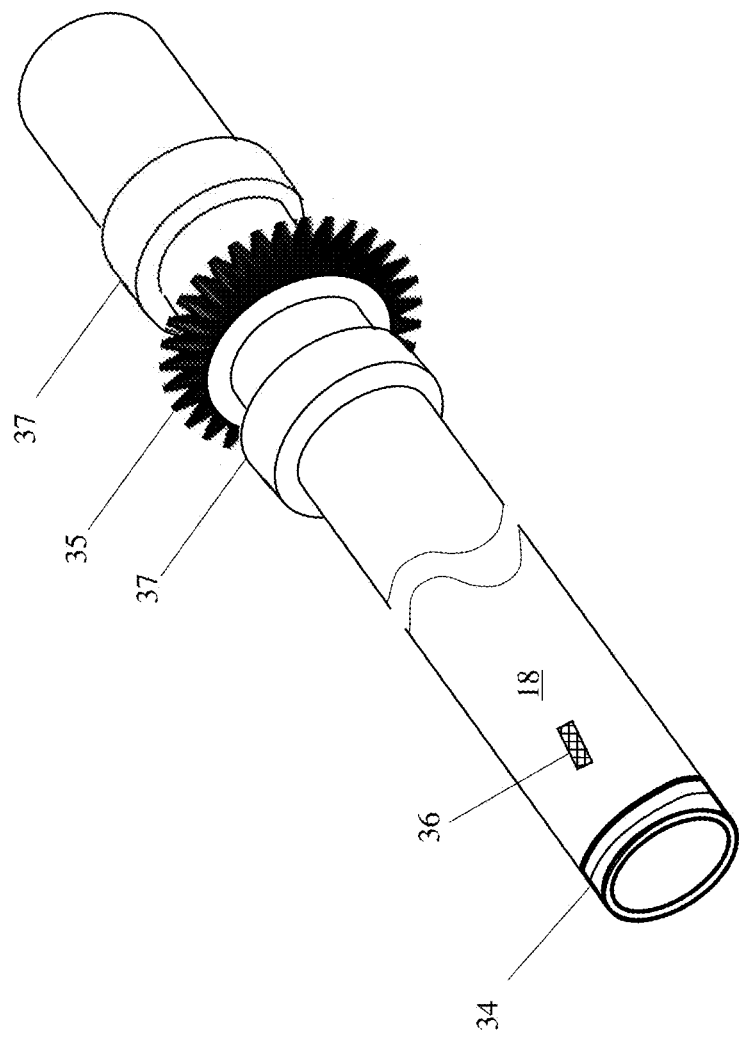
FIG. 7 is an elevational isolation view of the selection tube 18 and the associated components. Specifically, FIG. 7 includes two collars 37, a pressure sensor 36, and the selection tube rotating gear 35.

As shown in FIG. 5A, the selection tube control assembly 17 housing further comprises three stabilization and support rollers 29 mounted 120 degrees apart, on the front face of the front vertical plate 25. Likewise, as shown in FIGS. 6A and 6B, there are three essentially mirror-image support rollers 39 mounted on the rear face of the back vertical plate 27. The support rollers 29, 39 engage the outer diameter of raised collars 37 that are attached to the selection tube 18. The support rollers 29, 39, essentially act as roller bearings to support and limit the movement of the selection tube 18, while simultaneously facilitating the rotation of the tube 18 about its axis.

In the preferred embodiment shown in FIGS. 1 and 4-7, an electric motor (not shown) drives a small driving gear 33 via (at least) a reduction gear box (not shown) that is well known in the art. As shown in FIGS. 4-6, the driving gear 33 is mounted on the front face of the back vertical plate 27. The driving gear 33 drives the larger rotating gear 35, which encircles and is integral with the selection tube 18. The driving gear 33 and the rotating gear 35 are positioned within the selection tube control assembly 17 housing and between the two collars 37.

Figure 8:
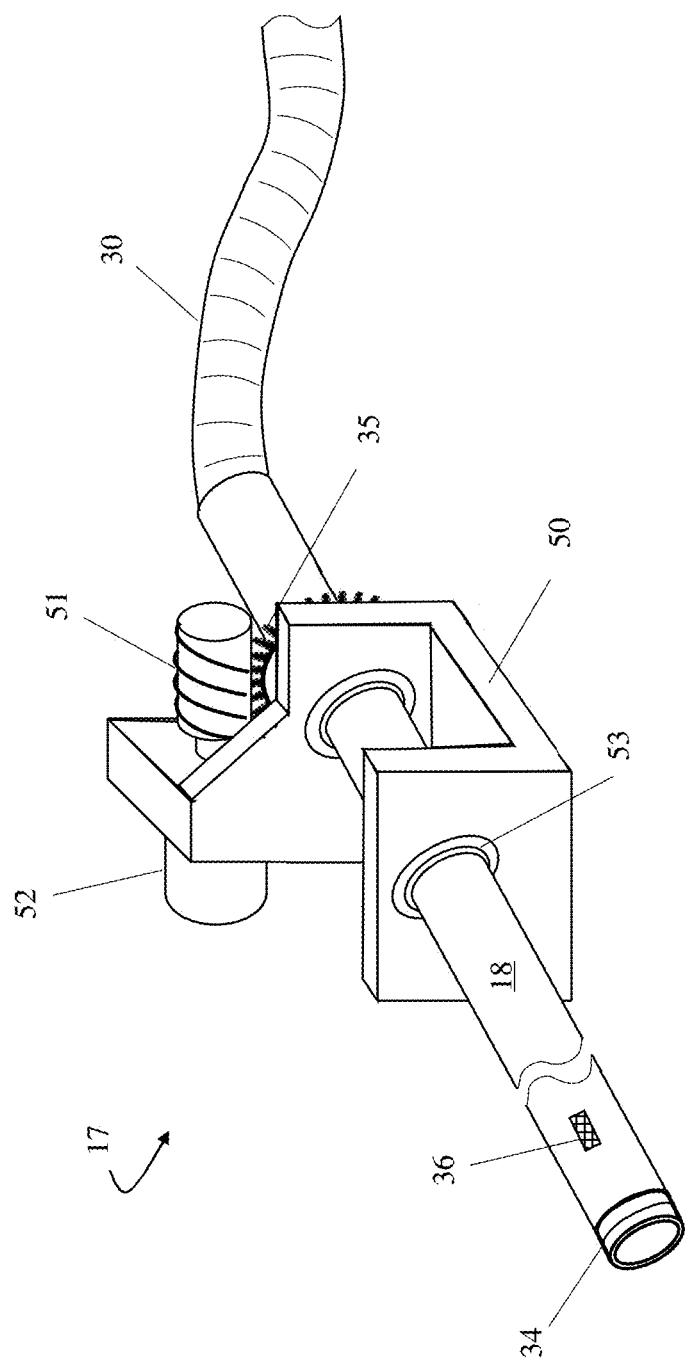
FIG. 8 shows an alternative embodiment of the selection tube control assembly 17 (the preferred embodiment is shown in FIGS. 4-7). The FIG. 8 alternative embodiment includes a unitary support bracket 50 and an alternative worm/screw gear 51 drive mechanism.
Figure 9:
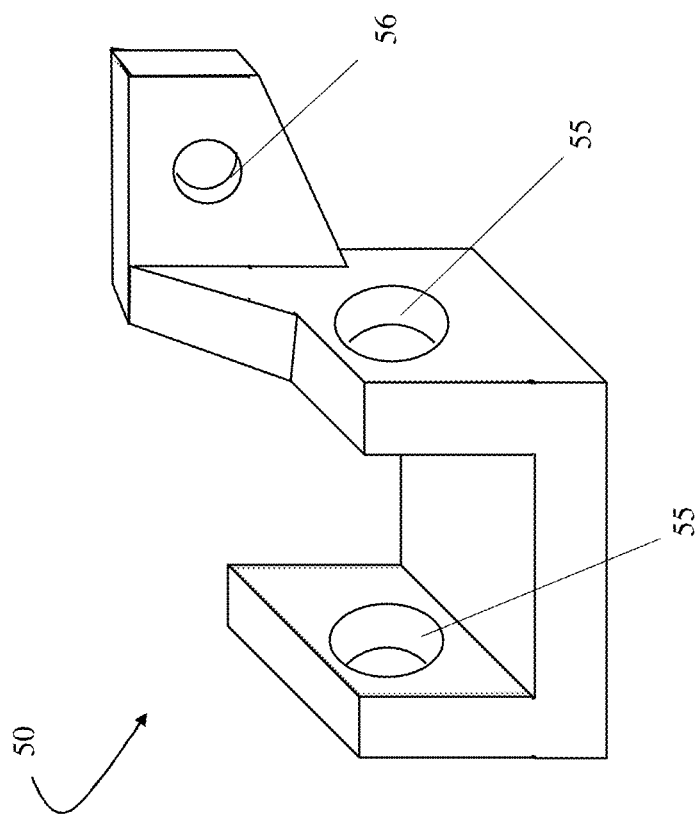
FIG. 9 is an elevational view of the single piece mounting structure 50 for the alternative embodiment shown in FIG. 8.
Figure 10:
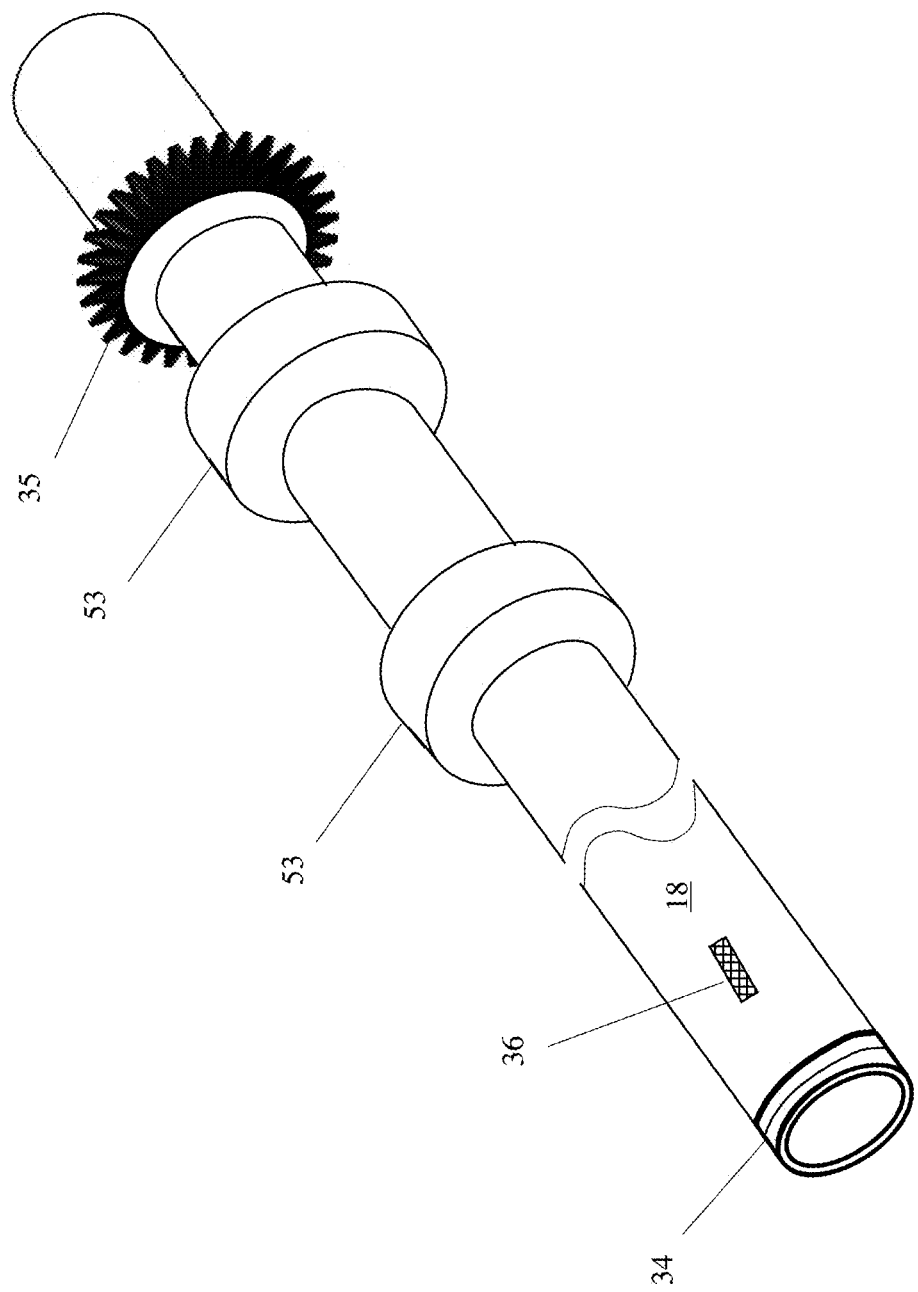
FIG. 10 is an elevational isolation view of the alternative selection tube 18 and the associated components for the embodiment shown in FIG. 8-9.
Figure 11B:
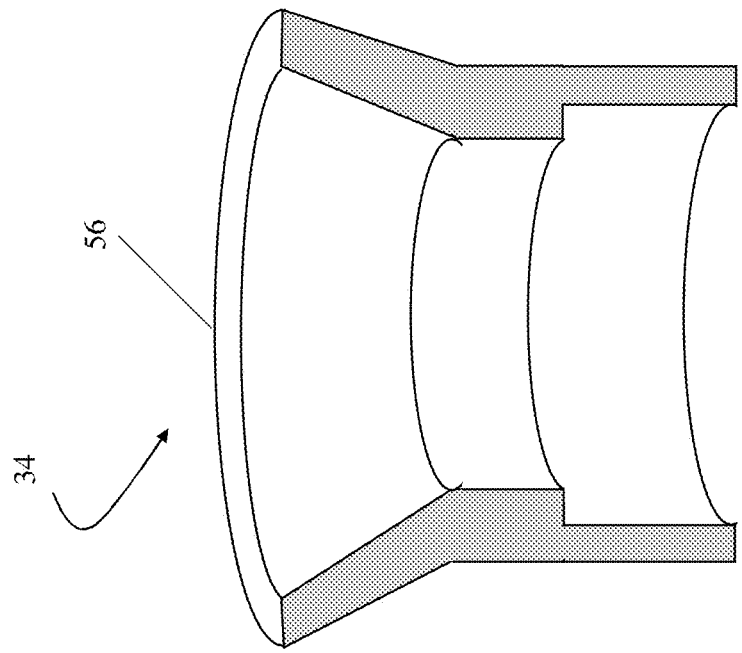
FIG. 11B is a funnel-shaped end effector 56.
Figure 11A:
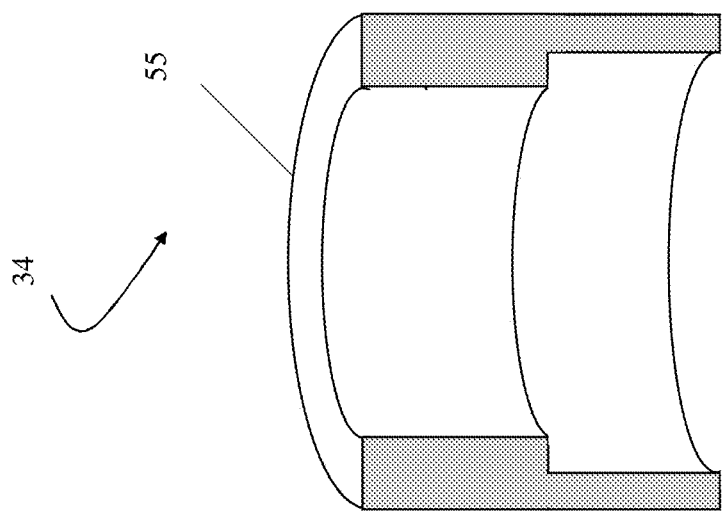
FIG. 11A is a straight end effector 55.
Figure 11D:
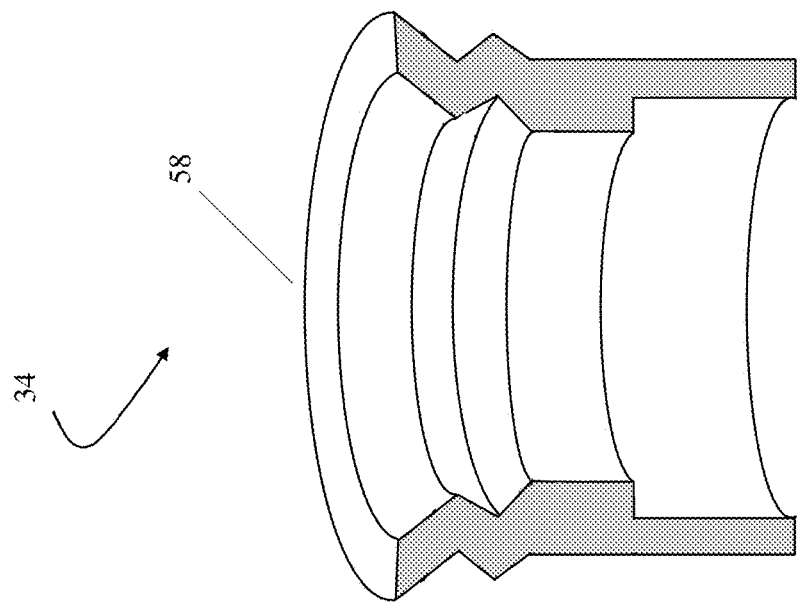
FIG. 11D is a bellows-shaped end effector 58.
Figure 11C:
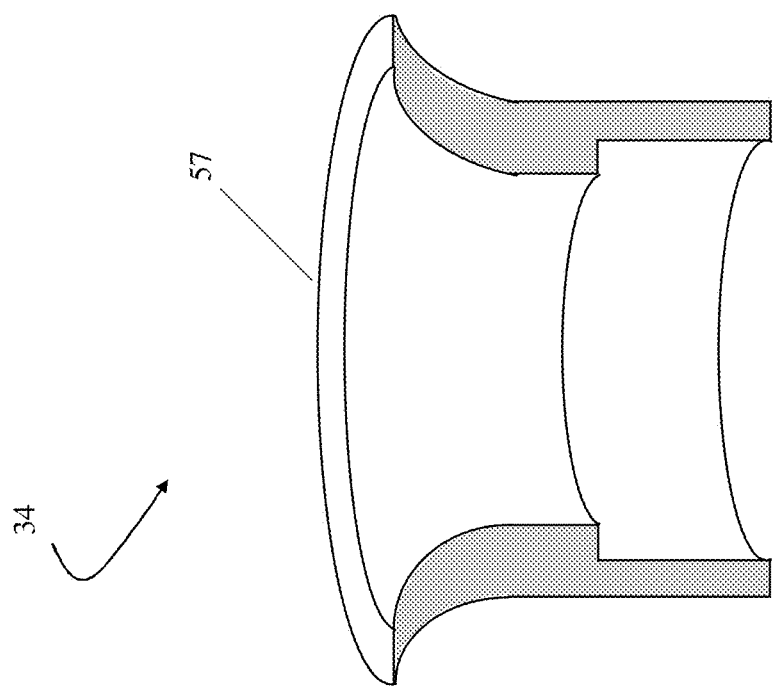
FIG. 11C is a curved funnel-shaped end effector 57.

In an alternative embodiment shown in FIGS. 8-10, the selection tube control assembly 17 comprises an auxiliary electrical motor 52 that drives a worm/screw type gear 51. The worm/screw-type gear 51 meshes with and drives a large driving gear 35. The large driving gear 35 encircles and is integral with the selection tube 18 so that when the large driving gear 35 rotates, the vacuum selection tube 18 is also rotated.

The selection tube 18 is supported by a unitary support bracket 50 as shown in FIG. 9. The unitary support bracket comprises a set of parallel aligned apertures 55. As shown in FIGS. 8 and 10, each aperture 55 accommodates a support bearing 53 that encircles the selection tube 18. The support bearings preferably comprise roller type bearings, although other bearings types capable of the function described herein should be considered within the scope of the invention. As the selection tube 18 rotates inside the support bearings 53, the support bearings 53 are structurally supported within the apertures 55. The unitary support bracket aperture 56 accommodates the auxiliary motor 52 driving shaft—which drives the worm/screw-type gear described supra.

In operation, in the preferred embodiment, a stereo graphic camera 12 identifies a targeted apple A within an area of interest and sends location data to a controller 14. The controller 14 directs the linear actuator to move a sliding base 22 along a slotted track 24 and the panning mechanism 20 and the tilting mechanism 16 to rotate for specific degrees of angle in synchronization or in sequence until a fruit selection assembly 16, 17, 18, 19, 20 reaches to the targeted apple A. When the apple-gripping orifice 34 of the selection tube 18 is adjacent to the targeted apple A, the targeted apple A is sucked onto the orifice 34 via vacuum pressure emanating from the selection tube 18 so that the targeted apple A is firmly gripped by the selection tube orifice 34 (see FIGS. 2 and 3). The orifice 34 has a soft, flexible, and resilient surface and may have a variety of specific configurations (as shown in FIGS. 11A.-11D.) so that the surface of the orifice 34 creates at least a partial seal with the targeted fruit A.

When the targeted apple A is gripped by the orifice 34, the vacuum pressure inside the selection tube drops rapidly. Once the vacuum pressure reaches a pre-set threshold detected by a pressure sensor 36, the controller 14 sends a signal to the electric motor connected to the driving gear 33 of the selection tube control assembly 17. The selection tube 18 (and the apple A) is then rotated by the driving gears 33, 35 that comprise a rotation mechanism of the selection tube control assembly 17. As the apple stem frays, the linear actuator retracts on the sliding base 22 and the associated selection tube 18 back away from the canopy—and the apple A is detached from the tree. After the apple is detached, the controller 14 directs the selection tube 18 and the attached apple A to a collection area where the apple is deposited by shutting off (or otherwise varying) airflow in the selection tube 18.

When the controller 14 (via the camera 12) determines that all of the targeted apples accessible by the selection tube 18 have been picked, then the controller 14 directs the pneumatic actuator 24 and/or the hydraulic lift 26 to move the selection assembly 16, 17, 18, 19, 20 to another area of the canopy. When all of the targeted apples on the tree have been picked, then the controller 14 directs the system 10 to withdraw the selection assembly 16, 17, 18, 20 completely and the vehicle transporting the harvesting system 10 is moved to another tree or area of the orchard, or the harvest process is terminated.

In the preferred embodiment, multiple apple harvesting systems 10 are positioned on a single trailer, each of which is responsible for picking the apples in a specific vertical area of interest in a selected tree/orchard canopy. The systems 10 are controlled by a centralized computer/master controller which coordinates the multiple harvesting systems 10 to enable the continuous picking of apples from one tree to the next. The camera 12 on each harvesting system 10 takes images at a specific frame rate (e.g., 2 to 5 images per second), as the vehicle continuously moves forward in orchard. The cameras provide information in real time on the location of individual fruits within the area of interest, which changes continuously for each image. The computer then determines and plans the order of picking fruits within the area of interest.

The trailer is moved from tree to tree through an orchard. As the fruit is harvested, it is sorted using the sorting method and apparatus described in U.S. Pat. No. 9,919,345, which was previously patented by one of the current inventors and is incorporated herein in its entirety. Upon returning to an operator's processing facility, the sorted apples are processed accordingly.

For the foregoing reasons, it is clear that the subject matter described herein provides a novel system and method for harvesting apples. The current system may be modified in multiple ways and applied in various technological applications. The disclosed method and apparatus may be modified and customized as required by a specific operation or application, and the individual components may be modified and defined, as required, to achieve the desired result.

For example, although the preferred embodiment of the invention is directed to harvesting apples, the picking/harvesting system may be used to harvest other fruits. Specifically, the system described herein can be used to harvest at least pears, oranges, lemons, and grapefruits, and may also be used to harvest any other fruits that are structured so that the fruit is "grippable" by a gripping orifice as described herein.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term (stated or implied as described supra) "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

The claimed invention is:

1. A fruit harvesting system comprising:
a camera identifying a targeted fruit;
a controller/processor in communication with the camera;
tilting and panning mechanisms in communication with the controller;
a vacuum module comprising at least a vacuum source, the vacuum module being in communication with the controller;
a vacuum selection tube being in pneumatic communication with the vacuum module, the vacuum module generating suction in the vacuum selection tube; and,
a gripping orifice positioned on an end of the vacuum selection tube;
wherein the vacuum selection tube further comprises a pressure sensor in communication with the controller, wherein the pressure sensor is configured to measure and monitor a drop in the vacuum selection tube vacuum pressure;
whereby, the system is configured so that after the camera identifies the targeted fruit, the processor directs the tilting and panning mechanisms to move the vacuum selection tube adjacent to the targeted fruit so that suction from the vacuum selection tube enables the gripping orifice to grip, hold, and detach the targeted fruit from a plant, wherein the gripping orifice is rotated about the axis of the vacuum selection tube to detach the targeted fruit from the plant responsive to the pressure sensor sensing that the drop in the vacuum selection tube vacuum pressure has reached a preset threshold.

2. The system of claim 1 wherein the camera comprises at least one three-dimensional stereographic camera.

3. The system of claim 1 wherein the system further comprises an expandable vacuum hose connecting the vacuum selection tube to the vacuum module.

4. The system of claim 1 wherein the pressure sensor sensing the pressure drop has reached the preset threshold indicates to the controller that the gripping orifice is gripping and holding the fruit.

5. The system of claim 1 wherein the gripping orifice comprises a soft, flexible, and resilient surface and forms at least a partial vacuum seal with the targeted fruit so that the gripping orifice can grip and hold the targeted fruit.

6. The system of claim 1 wherein the gripping orifice is rotated in one direction for a specific angle, or rotated multiple full or partial revolutions, or rotated in one direction and then rotated in the opposite direction to detach the targeted fruit from the plant.

7. The system of claim 1 wherein the gripping orifice is selected from a group consisting of: a generic gripping orifice, a straight end effector, a funnel-shaped end effector, a curved funnel-shaped end effector, and a bellows-shaped end effector.

8. The system of claim 1 further comprising a large driving gear that encompasses and is attached to the vacuum selection tube, so that rotating the large driving gear rotates the vacuum selection tube and the gripping orifice, thereby detaching the fruit from the plant.

9. The system of claim 8 wherein the large driving gear is rotated by a smaller driving gear so that the small and large driving gears are positioned within a single rotational mechanism housing.

10. A fruit harvesting system comprising:
a camera identifying a targeted fruit;
a controller/processor in communication with the camera;

tilting and panning mechanisms in communication with the controller;

a vacuum module comprising at least a vacuum source, the vacuum module being in communication with the controller;

a vacuum selection tube being in pneumatic communication with the vacuum module, the vacuum module generating suction in the vacuum selection tube; and, a gripping orifice positioned on an end of the vacuum selection tube;

whereby, the system is configured so that after the camera identifies the targeted fruit, the processor directs the tilting and panning mechanisms to move the vacuum selection tube adjacent to the targeted fruit so that suction from the vacuum selection tube enables the gripping orifice to grip, hold, and detach the targeted fruit from a plant;

further comprising a large driving gear that encompasses and is attached to the vacuum selection tube, so that rotating the large driving gear rotates the vacuum selection tube and the gripping orifice, thereby detaching the fruit from the plant, wherein the large driving gear is rotated by a smaller driving gear so that the small and large driving gears are positioned within a single rotational mechanism housing, wherein a system of support and stabilizing rollers are positioned on an outer face of the rotational mechanism housing, the rollers supporting and stabilizing the vacuum selection tube.

11. The system of claim 10 wherein the stabilizing rollers engage raised collars that encircle the vacuum selection tube.

12. A fruit harvesting system comprising:
a camera identifying a targeted fruit;
a controller/processor in communication with the camera;
tilting and panning mechanisms in communication with the controller;
a vacuum module comprising at least a vacuum source, the vacuum module being in communication with the controller;
a vacuum selection tube being in pneumatic communication with the vacuum module, the vacuum module generating suction in the vacuum selection tube; and,
a gripping orifice positioned on an end of the vacuum selection tube;
whereby, the system is configured so that after the camera identifies the targeted fruit, the processor directs the tilting and panning mechanisms to move the vacuum selection tube adjacent to the targeted fruit so that suction from the vacuum selection tube enables the gripping orifice to grip, hold, and detach the targeted fruit from a plant;
further comprising a large driving gear that encompasses and is attached to the vacuum selection tube, so that rotating the large driving gear rotates the vacuum selection tube and the gripping orifice, wherein a screw-type gear drives the large driving gear, the vacuum selection tube being supported by a unitary support bracket, the unitary support engaging at least one support bearing which encircles the vacuum selection tube so that the vacuum support tube rotates within the at least one support bearing.

13. The system of claim 12 wherein the unitary support bracket supports multiple support bearings, the support bearings encircling the vacuum selection tube so that the selection rotates within the support bearings.

14. The system of claim 13 wherein the support bearings are roller bearings.

15. The system of claim 1 wherein the tilting and panning mechanisms as well as the vacuum selection tube are positioned on a sliding base and are moved laterally on a grooved track by a lateral movement means, the lateral movement means being in communication with the controller.

16. The system of claim 15 wherein the lateral movement means is pneumatic.

17. The system of claim 1 wherein a vertical lifting means that is controlled by the controller moves the tilting and panning mechanisms as well as the vacuum selection tube vertically.

18. The system of claim 17 wherein the vertical lifting means comprises a telescoping hydraulic lift.

19. A method of picking fruit, the method comprising:
(a) providing the system of claim 1;
(b) positioning the system on a vehicle;
(c) moving the vehicle and system and positioning the system adjacent to a plant;
(d) directing the camera to a region of interest on the plant and providing power to the system so that the system picks the fruit from the plant; and
(e) placing the picked fruit in a collection bin on the vehicle.

* * * * *